Figure 3:
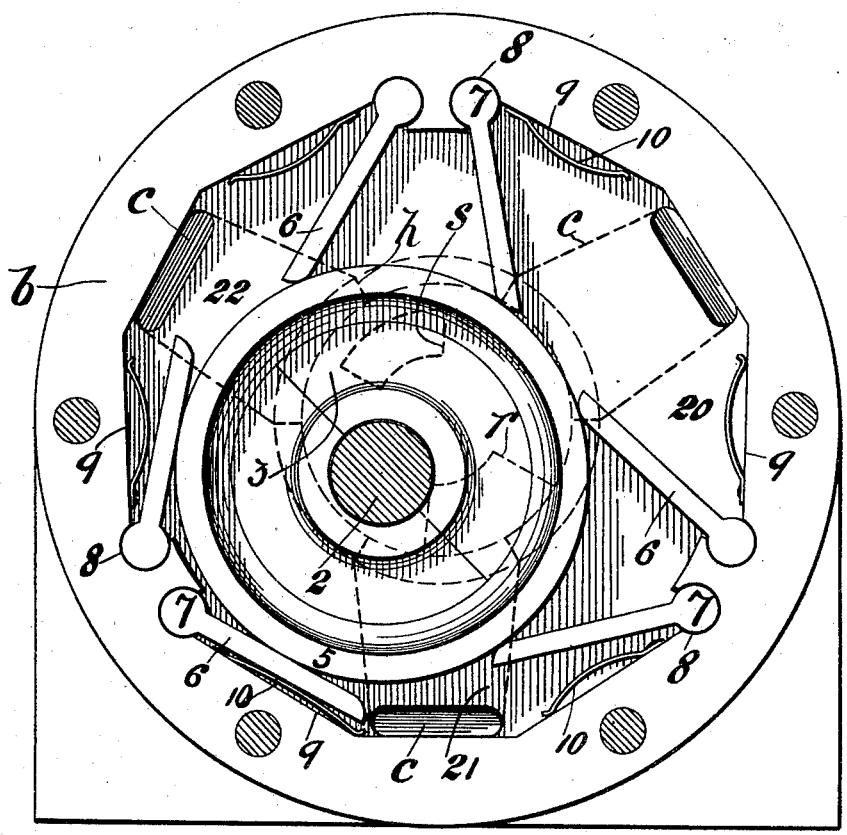

No. 696,766. Patented Apr. 1, 1902.
F. H. SLEEPER.
ENGINE.
(Application filed Oct. 29, 1900.)
(No Model.) 2 Sheets—Sheet 1.
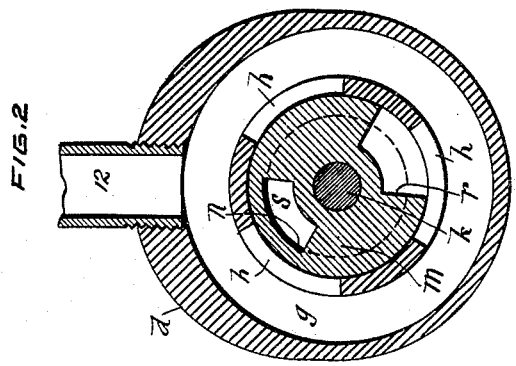
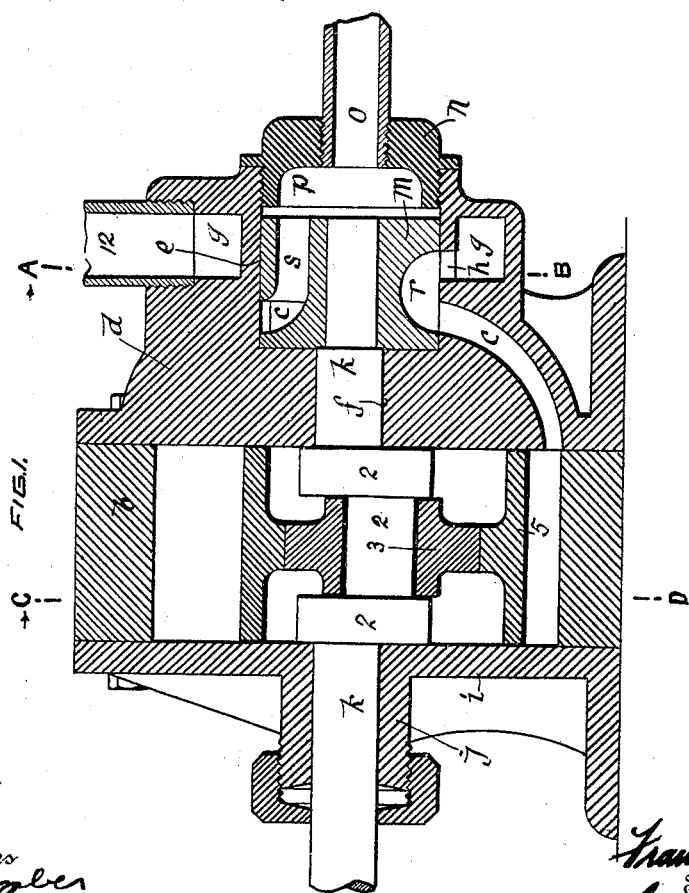
Witnesses
Frank H. Sleeper
Inventor
By his Attorney

UNITED STATES PATENT OFFICE.

FRANK HENRY SLEEPER, OF WESTMOUNT, CANADA, ASSIGNOR OF ONE-HALF TO THE NORTH WEST SHOE COMPANY, LIMITED, OF MONTREAL, CANADA, A CORPORATION.

ENGINE.

SPECIFICATION forming part of Letters Patent No. 696,766, dated April 1, 1902.

Application filed October 29, 1900. Serial No. 34,772. (No model.)

*To all whom it may concern:*

Be it known that I, FRANK HENRY SLEEPER, of the town of Westmount, district of Montreal, and Province of Quebec, Canada, have invented certain new and useful Improvements in Engines; and I do hereby declare that the following is a full, clear, and exact description of the same.

My invention has for its object to reduce the friction in engines to a minimum and to provide an engine of greater efficiency than has been attainable heretofore.

The invention may be said, broadly speaking, to consist in its broadest conception of an engine having an expansible chamber arranged adjacent to a shaft which is preferably either cranked or provided with an eccentric, said chamber consisting of a wall stationary relatively to said shaft and a flexible wall between said stationary wall and said shaft and inclosing a portion of said stationary wall with tight joints at the abutting edges of said stationary and flexible walls, and said chamber being adapted upon the admission of an expansile fluid thereinto to distend the flexible wall thereof toward said shaft, an intermediary being provided which is constantly free of said stationary wall and rotatively connects said shaft to said flexible wall, whereby the thrust of said flexible wall in the expansion of said chamber will be caused to rotate the shaft, valvular mechanism being provided to cause said chamber to exhaust when the distention thereof fails to exert a rotative force upon the crank, thereby leaving the wall of said chamber adjacent to the crank free to be moved back to its normal position by the crank or eccentric as it rotates by its own momentum or under the influence of another expansible chamber similarly connected, but arranged at a different angular position relatively to the shaft. I prefer to utilize a series of such chambers and valvular means to cause an expansile fluid to be supplied to said series of chambers successively.

The preferred embodiment may be said to consist of a cylinder inclosing the shaft, a part carried by the shaft and eccentric thereof, said part being free at all times of the circumferential interior of said cylinder, a series of flexible walls disposed around the circumferential interior of said cylinder, tight joints being provided between the component parts of said flexible walls and the ends of each of said flexible walls and the portions they inclose of the interior of the cylinder. These flexible walls are each preferably constituted by a pair of divisions, each pivotally connected at one end to the interior of the cylinder and bearing at its other end upon said eccentric part, said divisions and the portion of the eccentric between them forming the said flexible wall and said flexible wall and the portion of the interior of the stationary cylinder inclosed thereby forming each complete expansible chamber of the series, and an expansile-fluid supply to and exhaust from such series under the control of an automatic cut-off valve actuates the engine.

For full comprehension, however, of my invention, reference must be had to the accompanying drawings, forming a part of this specification, in which like reference characters indicate the same parts, and wherein—

Figure 1 is a longitudinal vertical sectional view of my improved rotary engine; Fig. 2, a detail sectional view of the automatic cut-off valve, taken on line A B, Fig. 1, and Fig. 3 a transverse vertical sectional view taken on line C D, Fig. 1.

I have illustrated and will hereinafter describe my invention as constructed with three chambers, although it can, to meet requirements, be constructed with any number.

The cylinder *b* has a series of three ports *c* cut in its head *d* at equidistant points around the cylinder and communicating therewith at one end adjacent to the perimetrical wall and at their other ends with a valve-chamber *e* near the inner end thereof and concentric of a boring *f* for the shaft *k*. This cylinder-head is also formed with an annular steam-passage *g*, with which said valve-chamber communicates by means of a series of three ports *h*, each in line with one of the ports *c*, and the other cylinder-head *i* is formed with a bearing *j* for the shaft *k*, which projects therethrough and through the boring $f$, which also constitutes a bearing, and into the valve-chamber.

A cylindrical valve $m$ is located in the valve-chamber and is mounted rigidly upon the end of the shaft, which is diminished to receive it, and a cap $n$ closes the end of the valve-chamber and is formed with an exhaust-port $o$ and a cavity $p$, while the valve is formed with a semicircular recess $r$ in its perimeter to at times effect a communication between the corresponding ports $h$ and $c$, and also has a curved port $s$ to at times effect a communication between the port $c$ and the cavity $p$.

The engine proper, which is the principal feature of my invention, is formed by offsetting a portion of the shaft within the cylinder, as at 2. Upon this offset portion I mount a hub 3, which is split to enable it to be fitted in place, and the perimeter thereof has an annulus 5 fitted rigidly thereon. This annulus is of a width to closely fit the ends of the cylinder and of an outside diameter to be constantly a short distance from the inside of the cylinder. The partitions that I prefer to use consist of a series of blades 6, arranged in pairs and with one end enlarged and rounded, as at 7, to take into a series of sockets 8 in the cylinder-wall and arranged in pairs and located midway between the ports $h$. The portions 9 of the interior of the cylinder-wall intervening the sockets 8 and ports $h$ are flattened and carry a series of bow-springs 10 to prevent the blades 6 lying flat against the said flattened portions 9, and the free ends of said blades are rounded on the sides thereof adjacent to the eccentric. Each adjacent pair of blades constitutes a partition, and the two adjacent blades of each adjacent pair of partitions, with the partition between them of the interior of the cylinder, and the portion of the annulus between their bearing ends, constitute an expansible chamber, the flexible wall whereof consists of the said blades and the portion of the annulus between their bearing ends, while the hub 3 constitutes an intermediary to transmit the thrust of the flexible wall due to the expansion of the chamber to the crank, thus rotating the shaft.

The operation of my improved engine is as follows: The steam is admitted through pipe 12 to the annular passage $g$, and thence successively by ports $h$ to the chambers 20, 21, and 22, through the medium of valvular port $r$ as it registers with the ports $h$. When steam is admitted to, say, chamber 20, it will cause its flexible wall, through the hub or intermediary 3, to bear upon and rotate the crank. The steam continues to act upon the crank until said crank is diametrically opposite to the inlet-port, where the valvular port $s$ will register with the port $h$, and said chamber will then be exhausted through its port $h$, said port $s$, cavity $p$, and exhaust-port $o$.

The arrangement of the valvular ports $r$ and $s$ diametrically opposite to one another and the circumferential extent thereof illustrated enable the valve to cut off the steam from each chamber and allow it to act under expansion until the exhaust-port is connected, while the loose connection between the hub and crank reduces the wearing friction between the thrust-walls and the crank to a minimum.

What I claim is as follows:

1. The combination of a shaft, a stationary part located adjacent to said shaft, a pair of partitions each in steam-tight contact at one end with the side of said stationary part adjacent to said shaft, means in rotative relation with the shaft and forming in conjunction with said partitions and stationary part an expansible chamber, and an expansile-fluid supply to and exhaust from said chamber.

2. The combination of a shaft, a stationary part located adjacent to said shaft, a pair of partitions each in steam-tight contact at one end with the side of said stationary part adjacent to said shaft, means constantly free of said stationary part and in rotative relation with the shaft and forming in conjunction with said partitions and stationary part an expansible chamber, and an expansile-fluid supply to and exhaust from said chamber.

3. The combination with the cylinder of an engine and a shaft extending therethrough, of an eccentric mounted upon and rotatable with said shaft, a series of partitions, each partition being in steam-tight contact at its sides with the interior of the cylinder and the eccentric respectively, an expansile-fluid supply to and exhaust from the spaces between the partitions, and means for controlling said expansile fluid to be supplied to said spaces successively, substantially as and for the purpose set forth.

4. The combination with the cylinder of an engine and a shaft extending therethrough, of an eccentric mounted upon and rotatable with said shaft, a series of pairs of partitions, each partition being in steam-tight contact at its sides with the interior of the cylinder and the eccentric respectively, an expansile-fluid supply to and exhaust from the alternate spaces between the adjacent pairs of said partitions, substantially as and for the purpose set forth.

5. The combination with the cylinder of an engine and shaft extending therethrough, of an eccentric mounted upon and rotatable with said shaft, a series of pairs of partitions, each partition being in steam-tight contact at its sides with the interior of the cylinder and the eccentric respectively, an expansile-fluid supply to and exhaust from the alternate spaces between the adjacent pairs of said partitions and means for controlling said expansile fluid to be supplied to said alternate spaces successively, substantially as and for the purpose set forth.

6. The combination with the cylinder of an engine and a shaft extending therethrough, of an eccentric mounted upon and rotatable with said shaft, a series of pairs of flexible partitions, said pairs being disposed equidistant from one another and each partition being in steam-tight contact at its ends with the interior of the cylinder and the eccentric respectively, an expansile-fluid supply to and exhaust from the spaces between the said pairs of partitions, and means for controlling said expansile fluid to be supplied to said spaces successively, substantially as and for the purpose set forth.

7. The combination with the cylinder of an engine and a shaft extending therethrough, of an eccentric mounted upon and rotatable with said shaft, a series of pairs of blades, said pairs being disposed equidistant from one another, and each blade being pivotally connected at one end to the interior of said cylinder and bearing at its other end loosely upon the eccentric, an expansile-fluid supply to and exhaust from the spaces between said pairs of blades, and means for controlling said supply to cause same to be supplied to said spaces successively, substantially as described and for the purpose set forth.

8. The combination with the cylinder of an engine and a shaft extending therethrough, of an eccentric mounted upon and rotatable with said shaft, said eccentric consisting of an offset portion of the shaft, a hub mounted loosely upon said offset portion, and an annulus mounted rigidly upon said hub, said annulus being of a width to closely fit the ends of said cylinder; a series of pairs of blades, said pairs being disposed equidistant from one another, and each blade being pivotally connected at one end to the interior of said cylinder and bearing at its other end loosely upon the eccentric, an expansile-fluid supply to and exhaust from the spaces between said pairs of blades, and means for controlling said fluid-supply to cause same to be supplied to said spaces successively, substantially as described and for the purpose set forth.

In testimony whereof I have affixed my signature in presence of two witnesses.

FRANK HENRY SLEEPER.

Witnesses:
WILLIAM P. McFEAT,
FRED. J. SEARS.